US010394884B1

(12) United States Patent
Gouyon et al.

(10) Patent No.: US 10,394,884 B1
(45) Date of Patent: Aug. 27, 2019

(54) SELECTING MEDIA FOR A SOCIAL EVENT ACCORDING TO SPECIFIED EVENT PARAMETERS

(71) Applicant: Pandora Media, LLC, Oakland, CA (US)

(72) Inventors: Fabien Gouyon, Berkeley, CA (US); Erik Michael Schmidt, Piedmont, CA (US); Andreas F. Ehmann, San Francisco, CA (US)

(73) Assignee: Pandora Media, LLC, Oakland, CA (US)

( * ) Notice: Subject to any disclaimer, the term of this patent is extended or adjusted under 35 U.S.C. 154(b) by 240 days.

(21) Appl. No.: 14/942,860

(22) Filed: Nov. 16, 2015

(51) Int. Cl.
*G06F 17/30* (2006.01)
*G06F 16/635* (2019.01)
*G06F 16/638* (2019.01)
*G06F 16/9535* (2019.01)

(52) U.S. Cl.
CPC .......... *G06F 16/635* (2019.01); *G06F 16/639* (2019.01); *G06F 16/9535* (2019.01)

(58) Field of Classification Search
CPC .......... G06F 17/3071; G06F 17/30713; G06F 17/30761; G06F 17/30772; G06F 17/30864; G06F 17/30867; G06F 16/635; G06F 16/9535; G06F 16/639
USPC ................ 707/732, 736, 737, 741, 754, 767
See application file for complete search history.

(56) References Cited

U.S. PATENT DOCUMENTS

| | | | | |
|---|---|---|---|---|
| 8,392,505 | B2 * | 3/2013 | Haughay, Jr. ..... | G06F 17/30749 709/205 |
| 8,782,712 | B2 * | 7/2014 | Mehta ................ | H04N 7/17318 725/59 |
| 2007/0208771 | A1 | 9/2007 | Platt | |
| 2008/0195239 | A1 * | 8/2008 | Rotholtz ................. | G06F 16/68 700/94 |
| 2010/0023578 | A1 * | 1/2010 | Brant ................ | G06F 17/30749 709/203 |
| 2010/0162115 | A1 * | 6/2010 | Ringewald ........ | G06F 17/30743 715/716 |
| 2012/0109979 | A1 | 5/2012 | Bernhardt | |

(Continued)

FOREIGN PATENT DOCUMENTS

JP 2012-502361 A 1/2012

OTHER PUBLICATIONS

Andre' Pang et al., Challenges of Networked Media: Integrating the Navigational Features of Browsing Histories and Media Playlists into a Media Browser, Oct. 2004, Multimedia '04, Proceedings of the 12th Annual ACM International Conference on Multimedia, pp. 480-483 (Year: 2004).*

(Continued)

*Primary Examiner* — Greta L Robinson

(74) *Attorney, Agent, or Firm* — Fenwick & West LLP

(57) ABSTRACT

A content server generates media playlists for social events. The content server receives a seed value describing desired characteristics of media to present during a social event, and event parameters describing conditions for selecting media items to generate a media playlist for the social event. The content server selects media items based on the event parameters and the seed value, and uses the selected media items to generate the media playlist for the social event. The media items in the playlist are retrieved from a media database and provided to a media player for presentation at the social event.

18 Claims, 5 Drawing Sheets

(56) References Cited

U.S. PATENT DOCUMENTS

| | | | | |
|---|---|---|---|---|
| 2012/0197987 A1* | 8/2012 | Mori | ...................... | G06Q 10/00 |
| | | | | 709/204 |
| 2012/0271882 A1* | 10/2012 | Sachdeva | ......... | H04N 21/26258 |
| | | | | 709/204 |
| 2012/0278715 A1 | 11/2012 | Faenger et al. | | |
| 2013/0031162 A1* | 1/2013 | Willis | ................ | H04L 65/1069 |
| | | | | 709/203 |
| 2013/0191454 A1 | 7/2013 | Oliver et al. | | |
| 2015/0213018 A1* | 7/2015 | Sanio | ............... | G06F 17/30053 |
| | | | | 707/802 |
| 2015/0293925 A1* | 10/2015 | Greenzeiger | ....... | G06F 16/4393 |
| | | | | 707/734 |
| 2016/0092559 A1* | 3/2016 | Lind | ................... | H04L 65/4084 |
| | | | | 715/716 |
| 2017/0041261 A1* | 2/2017 | Richter | ............. | G06F 17/30053 |

OTHER PUBLICATIONS

PCT International Search Report and Witten Opinion for PCT/US2016/012377, dated Jul. 28, 2016, 10 Pages.

* cited by examiner

SELECTING MEDIA FOR A SOCIAL EVENT ACCORDING TO SPECIFIED EVENT PARAMETERS

BACKGROUND

Field of Disclosure

The present invention generally relates to the delivery of content, and more specifically to ways of generating media playlists for social events using received seed values and event parameters.

Description of the Related Art

Many users utilize digital devices to present media content for consumption at social events with multiple attendees. Presenting appropriate media items (e.g., songs) at social events can have a notable impact on the way attendees experience the event. In some instances, event hosts choose media items for presentation. However, choosing media items that are appropriate for a particular social event can be difficult and time consuming.

SUMMARY

The above and other needs are met by a computer-implemented method, a non-transitory computer-readable storage medium storing executable code, and a device for generating a media playlist for a social event.

One embodiment of the computer-implemented method for generating a media playlist for a social event comprises receiving a seed value describing characteristics of media to present during the social event. The seed value may be a song name, band name, or music genre, and may be associated with media features stored in a media database. The method further comprises receiving event parameters describing conditions for selecting media items to generate the media playlist. Event parameters may comprise media feature rules, social event phases, seed preference rules, and user feedback. The method further comprises selecting a plurality of media items responsive to the event parameters and the seed value, and generating a media playlist for the social event based on the selected plurality of media items.

One embodiment of a non-transitory computer-readable storage medium storing executable computer program instructions for generating a media playlist for a social event comprises receiving a seed value describing characteristics of media to present during the social event. The seed value may be a song name, band name, or music genre, and may be associated with media features stored in a media database. The method further comprises receiving event parameters describing conditions for selecting media items to generate the media playlist. Event parameters may comprise media feature rules, social event phases, seed preference rules, and user feedback. The method further comprises selecting a plurality of media items responsive to the event parameters and the seed value, and generating a media playlist for the social event based on the selected plurality of media items.

One embodiment of a device for selecting media items for generating a media playlist for a social event comprises a processor configured to execute modules, and a memory storing the modules. The modules are executable to perform steps comprising receiving a seed value describing characteristics of media to present during the social event. The seed value may be a song name, band name, or music genre, and may be associated with media features stored in a media database. The method further comprises receiving event parameters describing conditions for selecting media items to generate the media playlist. Event parameters may comprise media feature rules, social event phases, seed preference rules, and user feedback. The method further comprises selecting a plurality of media items responsive to the event parameters and the seed value, and generating a media playlist for the social event based on the selected plurality of media items.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures and may indicate similar or like functionality.

Figure 1:
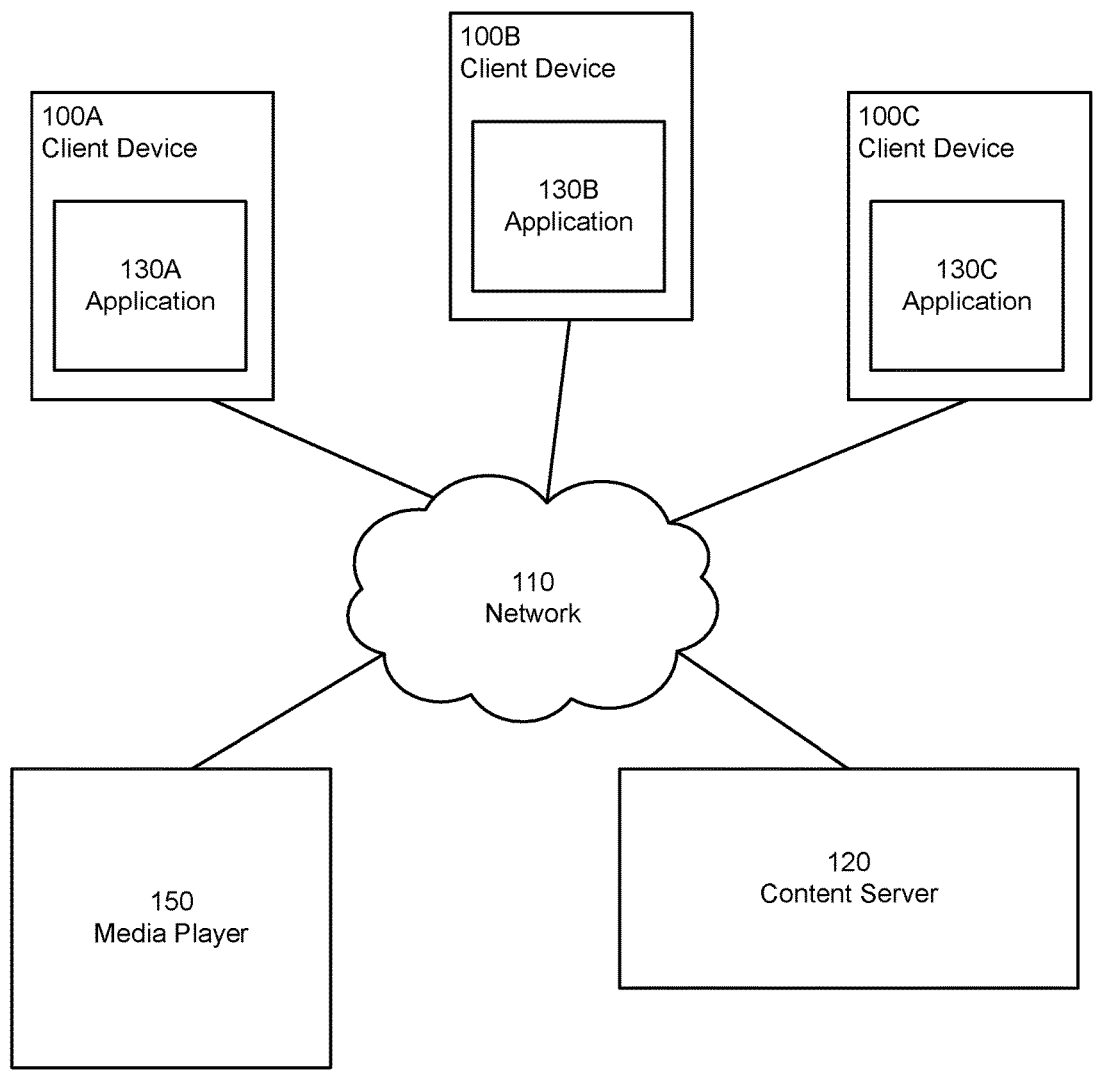
FIG. 1 is a high-level block diagram illustrating an embodiment of an environment for generating a media playlist for a social event.

FIG. 1 is a high-level block diagram illustrating an embodiment of an environment for generating a media playlist for a social event. The environment includes client devices 100 connected by a network 110 to a content server 120 and a media player 150. The media player 150 is connected by the network 110 to the content server 120. Here, three client devices 100A, 100B, 100C, one media player 150, and one content server 120 are illustrated but there may be different numbers of instances of each of these entities. For example, there may be thousands or millions of client devices 100 in communication with one or more content servers 120 and one or more media players 150. In one embodiment, the client devices 100 and the media player 150 of the environment of FIG. 1 are part of a social event (e.g., a party, social gathering, meeting, festival, etc.). For example, users of the client devices 100 may be gathered at a social event and consuming media presented by the media player 150. Thus, the client devices 100 and media player 150 may be geographically proximate while the content server 120 is remote.

The network 110 provides a communication infrastructure between the client devices 100 and the content servers 120. The network 110 is typically the Internet, but may be any network, including but not limited to a Local Area Network (LAN), a Metropolitan Area Network (MAN), a Wide Area Network (WAN), a mobile wired or wireless network, a private network, or a virtual private network.

The client devices 100 are computing devices such as smartphones with an operating system such as ANDROID® or APPLE® IOS®, tablet computers, laptop computers, desktop computers, electronic stereos in automobiles or other vehicles, dedicated music players, or other types of network-enabled devices on which digital content may be listened to or otherwise experienced. Typical client devices 100 include the hardware and software for outputting sound and images, and connecting to the network 110 (e.g., via Wifi and/or 4G or other wireless telecommunication standards).

A client device 100 includes an application 130 (e.g., application 130A, 130B, or 130C) that allows interaction with the content server 120. For example, the application 130 could be a browser that allows a user of the client device 100 to obtain content by browsing a web site of the content server 120. As another example, the application 130 could be a dedicated application specifically designed (e.g., by the organization responsible for the content server 120) to enable interactions with the content server 120 and its content.

The application 130 receives event parameters and seeds from the user of the client device 100. In one embodiment, the application 130 provides a user interface that allows a user to establish social events, specify event parameters, and choose seeds. The application sends seeds, parameters, and other received inputs to the content server 120.

In some embodiments, the application 130 allows a user, for example a host of a social event, to invite other users to specify parameters and/or seeds for a social event. Invited users may have access to the currently-playing stream and be able to interact with the stream. For example, the application 130 of the client device 100 of the host may broadcast the availability of the stream to other client devices 100 using short-range wireless communications; and on client devices located nearby, the application 130 may note the availability of the stream in the user interface, and in response to the user accepting the shared stream, show the playing stream along with controls allowing the user to comment on or otherwise interact with the stream. The application 130 may further display to users information about the social event, such as parameters and seeds that have been sent to the content server 120. The application 130 may allow users to interact with displayed information, for example, to vote for seeds (e.g., to demonstrate approval or disapproval for submitted seeds).

The application 130 collects feedback from the client device 100. The feedback may include express feedback and/or implicit feedback relating to presented media items. Express feedback is feedback provided by the user, for example by a user interface of the application 130, that directly expresses the user's preferences (i.e., like or dislike) for a media item. Implicit feedback is feedback that implicitly describes a user's preferences for a media item. Additionally, in some embodiments, the application 130 collects sequences of express feedback, implicit feedback, or some combination thereof.

The media player 150 presents media items at social events. The media player 150 may be a computing device such as a client device 100, or a component of a client device such as the application 130. The media player 150 may also be a dedicated device that includes the hardware and software needed to connect to the network 110 and output sound, images, or both.

In one embodiment, users of client devices 100 at the social event select and/or create a media channel for the social event. The media player 150 requests content associated with the requested media channel from the content server 120. The media player 150 receives media items (e.g., the media item is streamed) associated with the requested media channel and presents the media items to the user at the social event.

A media channel is a playlist of media items that are grouped together, where the media items share one or more common media features. A media item is a form of media content and is characterized by a set of media features that describe musicological features of the item (e.g., gender of singer, tempo, style). In one particular embodiment referred to throughout the remainder of the specification, the media item is audio content, such as a song, piece of music, or audio recording. It is appreciated, however, that in other embodiments a media item alternatively and/or additionally includes other forms of digital content, such as a video, movie, slideshow, or image. Thus, subsequent references to the media item or other audio-related terminology could equally apply to (for example) viewing videos or otherwise experiencing media provided by the content server 120 in other embodiments.

The content server 120 generates media channels for social events. The content server 120 receives event parameters and seed values from client devices 100. Generally, seed values describe characteristics of media users desire to be presented at social events, and event parameters describe conditions for selecting media items to generate media playlists for social events. The content server 120 may further receive a request for content from a media player 150. In one embodiment, the content server 120 identifies an existing media channel for content based on the event parameters and seed values, and streams media items associated with the media channel to the media player 150. In another embodiment, the content server 120 creates a media channel specific to the social event based on the event parameters and seed values received from the client devices 100. An embodiment of the content server 120 also collects feedback (i.e., express feedback and/or implicit feedback) from the client devices 100 associated with the social events.

The system illustrated in FIG. 1 thus provides a media player 150 that allows users to select music for social events by providing one or more characteristics of the music the users desire to be presented. The media player plays music selected using features provided by one or more users and also according to event parameters specific to the social event. As a result, users at social events can be involved with selecting music and hear music they want to hear while avoiding difficult and time-consuming aspects of creating playlists specific to social events.

Figure 2:
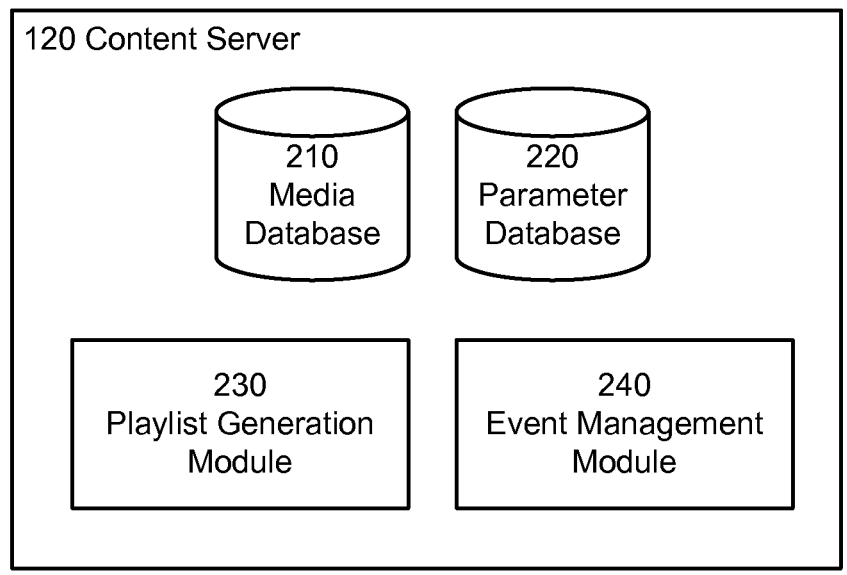
FIG. 2 is a high-level block diagram illustrating a detailed view of modules within the content server of FIG. 1 according to one embodiment.

FIG. 2 is a high-level block diagram illustrating a detailed view of modules within the content server 120 according to one embodiment. The content server 120 is comprised of modules including a media database 210, a parameter database 220, a playlist generation module 230, an event management module 240, and a feedback module 250. Some embodiments of the content server 120 have different modules than those described here. Similarly, the functions can be distributed among the modules in a different manner than what is described here.

The media database 210 stores information relating to media items, such as the media items and associated metadata (e.g., artist, name of track, etc.), playlists, and mappings of media items to media features. The media features (also referred to as musicological features) describe musicological characteristics of media items. For example, if the media item is a song, the media features of the song may indicate the underlying musicological characteristics of the song such as e.g., the gender of the singer, the type of background vocals, the tempo, the quality of the tones (e.g., pure or distorted), whether the melody dominates the composition, and an amount of gospel influence. A given media item may have many media features, such as 100-500 media features. In one embodiment, the mapping of media items to media features is established using the MUSIC GENOME PROJECT database created by PANDORA MEDIA, INC. of Oakland, Calif.

The parameter database 220 stores event parameters related to social events. Event parameters describe conditions for selecting media items for presentation during a social event as specified by the event host or other users associated with the event. Example event parameters include media feature rules, social event phases, seed preference rules, and feedback.

Media feature rules specify media features that should or should not be present in the media items presented during a social event. A media feature rule may designate a media feature as required, restricted, or preferred. A media feature designated as required must be found in media items presented at the social event. Conversely, a media feature designated as restricted must not be found in media items presented at the social event. Finally, a media feature designated as preferred is more likely than not found in media items presented at the social event. For example, if a social event organizer wants mostly instrumental music to be played at a social event, the organizer may designate a media feature corresponding to instrumental music as preferred.

Social event phases specify different features for different time periods during a social event. For example, for the first hour of a three hour party, a party host may wish to present songs with low energy (with energy determined, for example, by a function combining tempo and amplitude). For the second hour of the party, the host may want medium energy songs. For the third hour of the party, the host may want high energy songs. A first social event phase corresponding to the first hour may specify that media features corresponding to low energy are to be designated as preferred or required features during the first hour. A second social event phase corresponding to the second hour may specify that media features corresponding to medium energy are to be designated as preferred or required features during the second hour. A third social event phase corresponding to the third hour may specify that the media features corresponding to high energy are to be designated as preferred or required features during the third hour. Social event phases may use other features besides energy, and time ranges are user-adjustable. In one embodiment, event parameters specify different seed values for each social event phase, and different playlists may be generated for each phase based on the different seed values.

Seed preference rules specify relative priorities of seeds provided by the same or different users for a social event. Media features specified by higher priority seeds receive more weight than media features specified by lower priority seeds. Thus, the media items in a playlist for a social event will contain more features from higher priority seeds and fewer features from lower priority seeds. Using seed preference rules, an event host may specify, for example, that the host's seeds are prioritized over seeds from other users. The host may also specify that other users' seeds are prioritized. The host may specify that other users' seeds are prioritized based on the users' social network distance from the host.

Feedback, as discussed above, may include implicit or explicit feedback. Feedback may be received upon presentation of a media item by the media player 150 (e.g., as thumbs up or thumbs down selections), or upon selection and presentation of seeds via the user interface of the application 130 (e.g., as votes).

The playlist generation module 230 uses mappings of media items to media features to dynamically generate a media item playlist for a social event based on seed values and event parameters. In one embodiment, the playlist generation module 230 receives one or more seed values from users associated with a social event. As mentioned above, a seed value is an input from a user that describes what type of media channel he/she would like formed. A seed value may be, e.g., a name of a song, a name of a band, a name of genre of music, etc., and in some embodiments, the seed value may be characterized by a plurality of media features. The playlist generation module 230 extracts media features from the received seed values using, e.g., the mappings of media items to corresponding media features in the media database 210 to form a list of seed features. The playlist generation module 230 identifies a list of media items in the media database 210 having media features from the list of seed features. The playlist generation module 230 may designate seed features as required, restricted, or preferred or otherwise apply different weights to different seed features.

The playlist generation module 230 determines parameter features, which are media features corresponding to event parameters stored in the parameter database 220. The playlist generation module 230 may designate parameter features as required, restricted, or preferred or otherwise apply different weights to different parameter features.

In one embodiment, the playlist generation module 230 generates the media item playlist by using parameter features to filter the list of identified media items. For example, given a seed value identifying a band and an event parameter that requires a fast tempo, the playlist generation module 230 identifies seed features that characterize the band and parameter features that characterize a fast tempo. The playlist generation module 230 designates the parameter features that characterize a fast tempo as required. The playlist generation module 230 further produces a list of songs in the media database 210 that have the same media features as the seed features that characterize the band. The playlist generation module 230 filters the list of identified media items to exclude media items that lack the parameter features characterizing a fast tempo. Hence, the filtered list of identified media items is a media item playlist that contains only items having seed features characterizing the band and parameter features characterizing a fast tempo.

The event management module 240 receives and maintains event parameters from the client devices 100 and stores the event parameters in the parameter database 220. The event management module 240 also collects feedback from the client devices 100. The event management module 240 maintains the collected feedback from the client devices 100 for each user. The stored feedback includes express feedback and implicit feedback. The event management module 240 analyzes the collected feedback and to determine the users' preferences for media items (i.e., likes and dislikes) and the magnitudes of these preferences (i.e., the amount of the likes and dislikes).

In some embodiments, the event management module 240 analyzes for a media item collected feedback for multiple users associated with a social event to determine the users' preference for the media item. In one embodiment, playlists, event parameters, or both may be adjusted based on feedback. For example, if negative feedback exceeds a threshold, the event management module 240 may instruct the media player 150 to skip the song and play the next song in the playlist.

Figure 3:
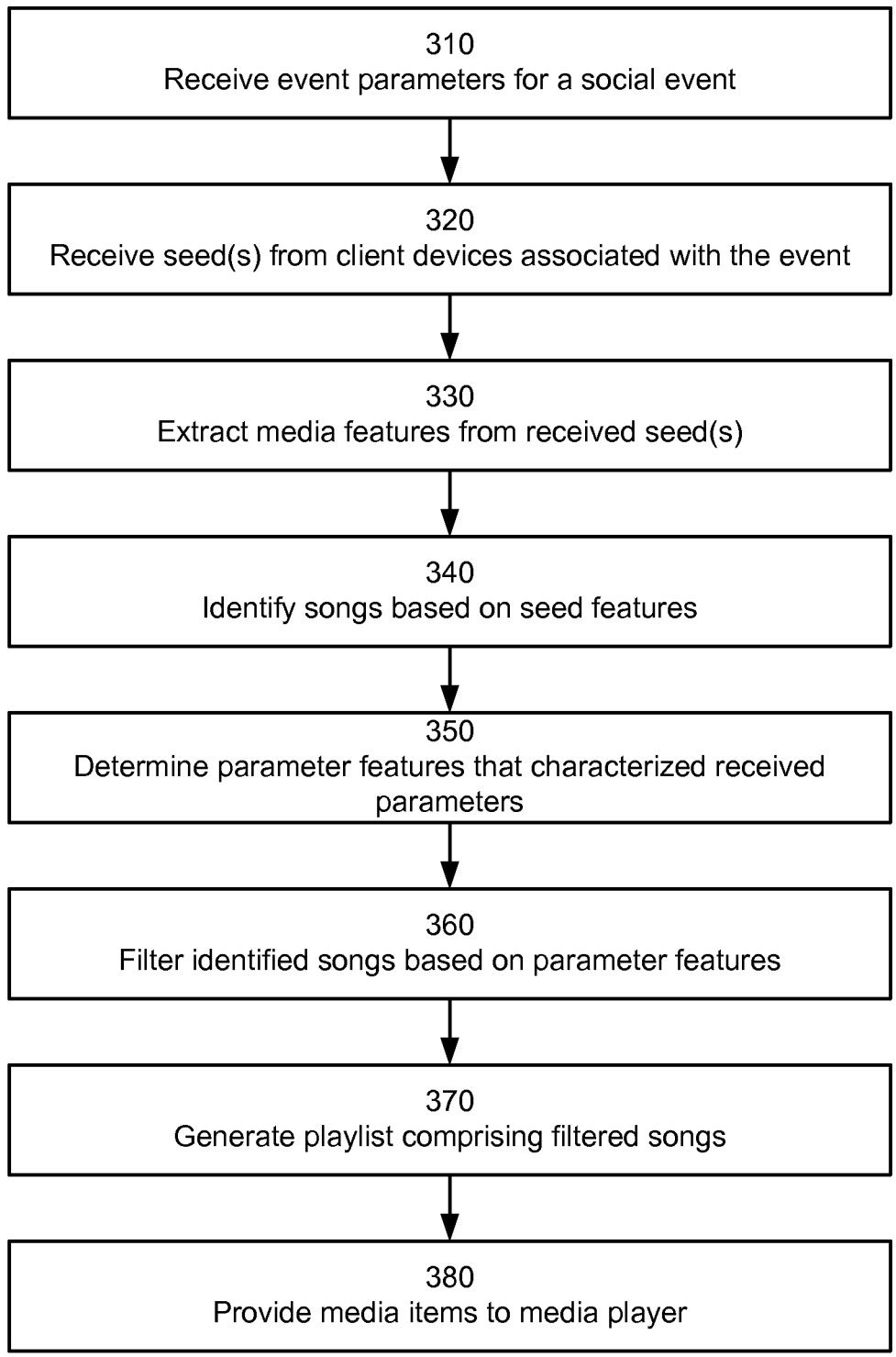
FIG. 3 is a flowchart illustrating a process of generating a playlist for a social event based on event parameters and seeds according to one embodiment.

FIG. 3 is a flowchart illustrating a process of generating a playlist for a social event based on event parameters and seeds according to one embodiment. In one embodiment, the process of FIG. 3 is performed by the content server 120. Other entities may perform some or all of the steps of the process in other embodiments. Likewise, embodiments may include different and/or additional steps, or perform the steps in different orders.

The content server 120 receives 310 event parameters for a social event. Event parameters may be received, for example, from a client device 100 of an event host or participant. Event parameters may be received before or during a social event, and may be received from multiple sources for the same social event. Received event parameters may be stored in the parameter database 220. The content server 120 also receives 320 one or more seed values from client devices 100 associated with the event. As discussed above. a seed value is an input from a user that describes what type of media channel he/she would like formed.

The content server 120 extracts 330 media features from the one or more received seeds to produce a list of seed features. The content server 120 may designate seed features as required, restricted, or preferred or otherwise apply different weights to different seed features. The content server 120 identifies 340 songs having the same or similar features as the list of seed features and conforming to feature designations.

The content server 120 determines 350 parameter features that characterize the received event parameters. Based on event parameters, the content server 120 may designate parameter features and/or seed features as required, restricted, or preferred or otherwise apply different weights to different parameter features or seed features. The content server 120 filters 360 the identified songs based on the parameter features and parameter feature designations. For example, the content server 120 may remove songs from a list of identified songs if the songs are not characterized by the parameter features. The content server 120 generates 370 a playlist comprising the filtered songs. The content server then provides 380 the media items on the playlist to the media player 150.

Figure 4:
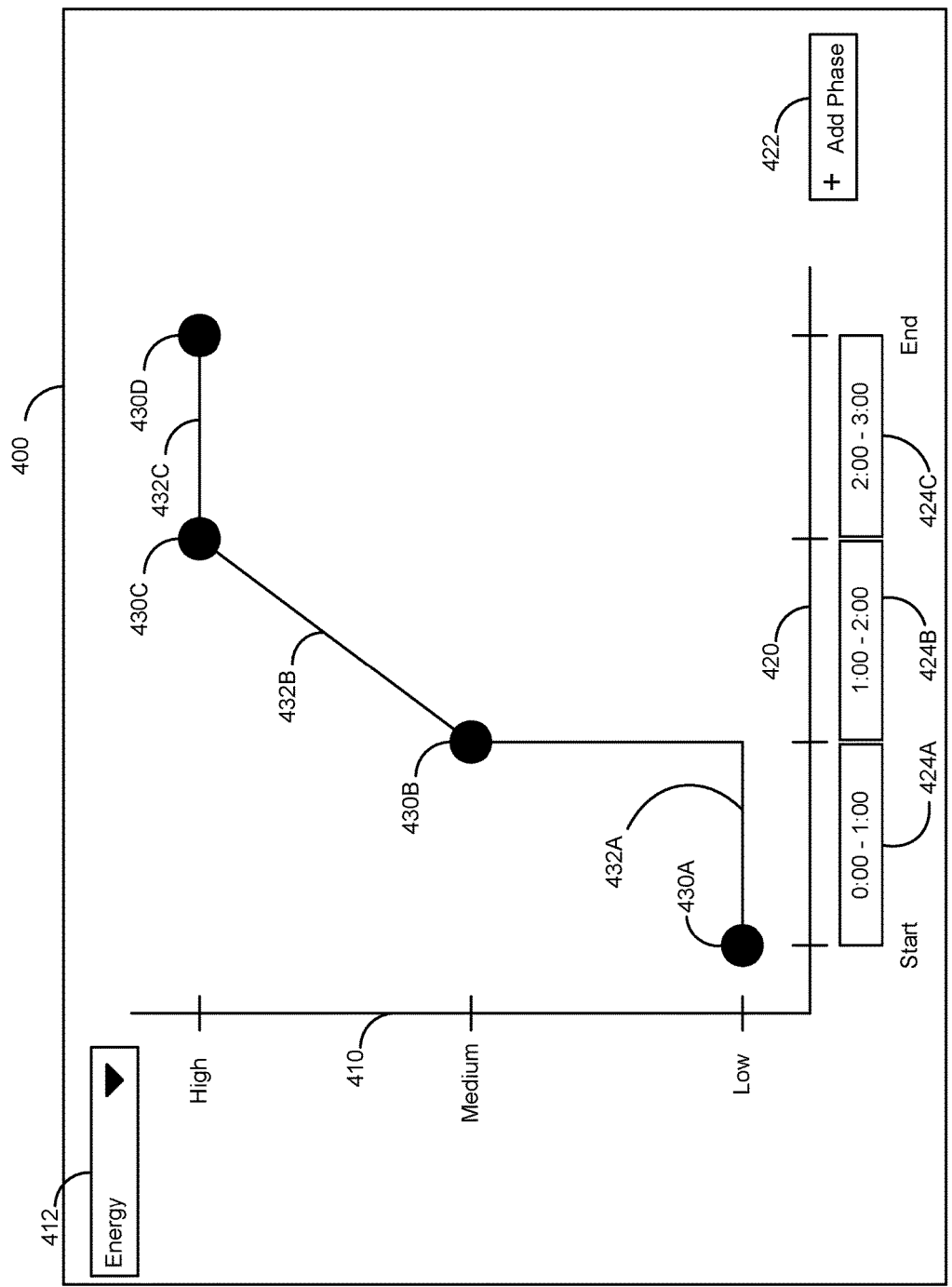
FIG. 4 shows an example user interface for defining social event phases.

FIG. 4 shows an example user interface 400 for defining social event phases. In one embodiment, the user interface of FIG. 4 is generated by an application 130 executing on a client device 100. A user interacts with the user interface in order to define phases for a social event that the user is hosting or otherwise attending.

The user interface includes a graph having a horizontal axis 420 and a vertical axis 410. The horizontal axis 420 represents the duration of the social event. Thus, time is measured along the horizontal axis from left to right. The illustrated interface of FIG. 4 includes hash marks on the horizontal axis 420 representing the start of the social event and points in time respectively occurring one, two, and three hours after the start of the event.

The user interface includes an add phase button 422 adjacent to the horizontal axis 420. The user uses the add phase button 4200 to associate phases with time intervals of the social event described by the horizontal axis 420. In the example of FIG. 4, the user has defined phases from zero to one hour, one hour to two hours. and two hours to three hours of the social event. These phases are respectively represented by boxes 424A, 424B, and 424C in FIG. 4.

The vertical axis, in turn, represents a value of one or more event parameters, with the value increasing along the axis from bottom to top. A selection box 412 allows a user to specify a parameter represented by the vertical axis from among multiple available parameters (e.g., energy level, tempo, amplitude, etc.). In use, the user uses the selection box 412 to select a particular parameter, and then interacts with the user interface to specify the parameter value during the various phases of the social event. The user may use the selection box 412 to specify the values of multiple independent parameters.

In the example of FIG. 4, the selection box 412 indicates that the "Energy" parameter is selected. In addition, the user has interacted with the graph to define the value of the energy feature at the various phases of the social event. Particularly, the user has indicated that the media items should have low energy at the start of the social event and increase to medium energy at the phase marking one hour into the event (as illustrated by nodes 430A and 430B and edge 423A in the graph). The user also indicated that the energy should increase gradually from medium intensity to high intensity at the phase marking two hours into the event, and remain at high intensity through the third phase of the event (as illustrated by nodes 430B, 430C, and 430D and edges 432B and 432C). As shown in this example, the user may select either an instant transition at the beginning of a phase or a gradual transition during a phase.

Figure 5:
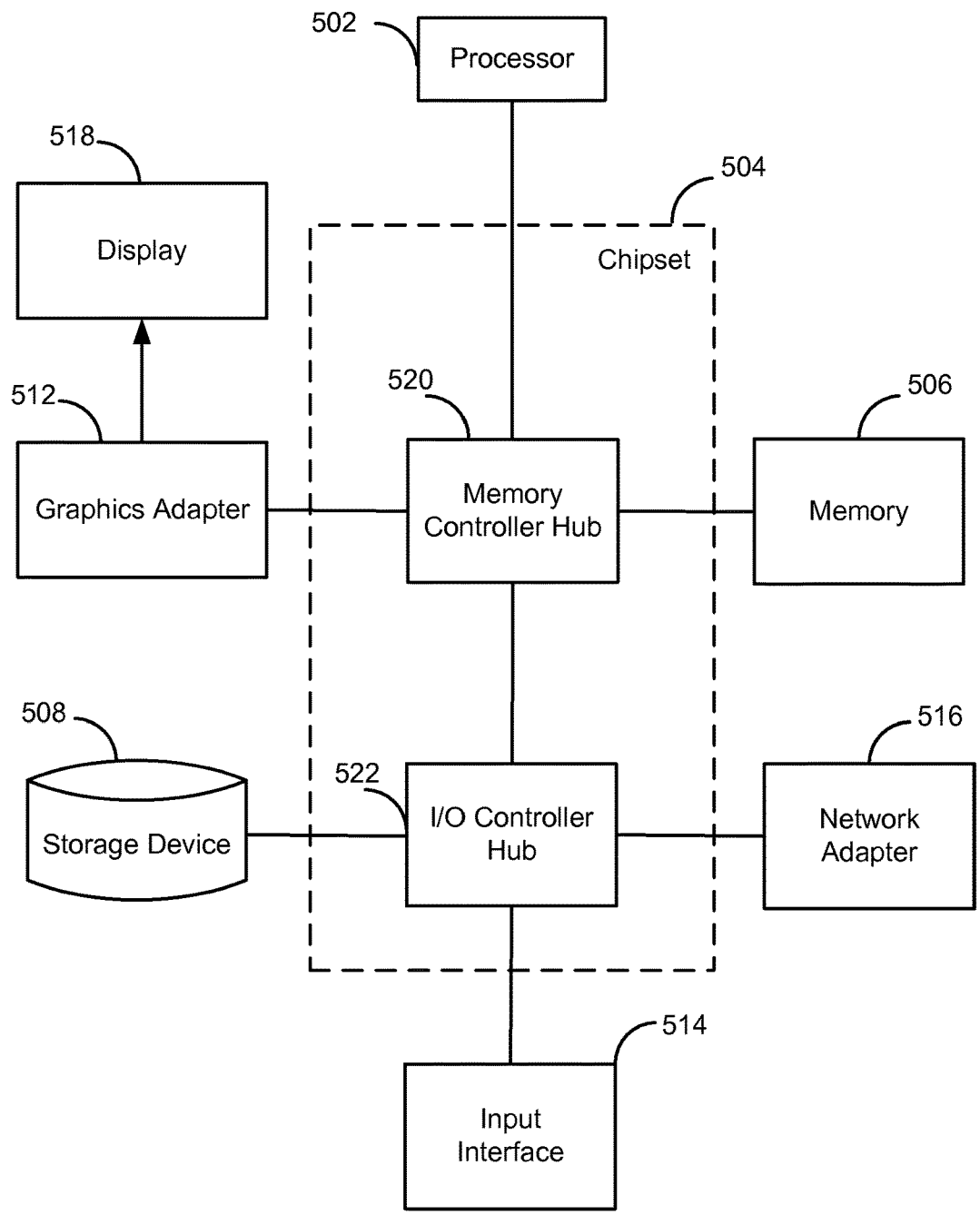
FIG. 5 is a high-level block diagram illustrating an example computer for implementing the entities shown in FIG. 1.

Turning now to a discussion of the implementation of client device 100 and/or the content server 120, FIG. 5 is a high-level block diagram illustrating an example computer 500 for implementing the entities shown in FIG. 1. The computer 500 includes at least one processor 502 coupled to a chipset 504. The chipset 504 includes a memory controller hub 520 and an input/output (I/O) controller hub 522. A memory 506 and a graphics adapter 512 are coupled to the memory controller hub 520, and a display 518 is coupled to the graphics adapter 512. A storage device 508, an input device 514, and network adapter 516 are coupled to the I/O controller hub 522. Other embodiments of the computer 500 have different architectures.

The storage device 508 is a non-transitory computer-readable storage medium such as a hard drive, compact disk read-only memory (CD-ROM), DVD, or a solid-state memory device. The memory 506 holds instructions and data used by the processor 502. The input interface 514 is a touch-screen interface, a mouse, track ball, or other type of pointing device, a keyboard, or some combination thereof, and is used to input data into the computer 500. In some embodiments, the computer 500 may be configured to receive input (e.g., commands) from the input interface 514 via gestures from the user. The graphics adapter 512 displays images and other information on the display 518. The network adapter 516 couples the computer 500 to one or more computer networks.

The computer 500 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 508, loaded into the memory 506, and executed by the processor 502.

The types of computers 500 used by the entities of FIG. 1 can vary depending upon the embodiment and the processing power required by the entity. For example, the content server 120 can run in a single computer 500 or multiple computers 500 communicating with each other through a network such as in a server farm. The computers 500 can lack some of the components described above, such as graphics adapters 512, and displays 518.

Other Considerations

Some portions of the above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for generating a media playlist for a social event. Thus, while particular embodiments and applications have been illustrated and described, it is to be understood that the described subject matter is not limited to the precise construction and components disclosed herein and that various modifications, changes and variations which will be apparent to those skilled in the art may be made in the arrangement, operation and details of the method and apparatus disclosed herein.

The invention claimed is:

1. A computer-implemented method for generating a media playlist for a social event, comprising:
   receiving, by a computer, event parameters describing conditions for selecting media items to generate the media playlist for the social event, the event parameters specifying that certain seed values are prioritized above other seeds values;
   receiving, by the computer, a plurality of seed values describing features of media to present during the social event, the plurality of seed values received from a plurality of client devices used by users at the social event, the client devices receiving a wireless broadcast indicating information about the media stream and enabling the plurality of users to provide seed values for the media stream;
   receiving, by the computer, seed preference rules provided by different ones of the plurality of users at the social event, the seed preference rules specifying relative priorities of the plurality of seed values;
   selecting, by the computer, a plurality of media items responsive to the event parameters and the plurality of seed values, wherein the selecting selects more media items with media features from higher priority seed values and fewer media items with media features from lower priority seed values based on the seed preference rules;
   generating, by the computer, a media playlist for the social event, the media playlist including playlist media items from the selected plurality of media items;
   retrieving, by the computer and from a media database, ones of the playlist media items; and
   providing, by the computer, the retrieved playlist media items to a media player that presents the playlist media items at the social event as a media stream.

2. The method of claim 1, wherein receiving event parameters comprises receiving event parameters specifying a plurality of required media features, wherein the selecting must select media items with the required media features.

3. The method of claim 1, wherein receiving event parameters comprises:
   receiving event parameters specifying a plurality of phases of the social event and specifying different seed values for each of the plurality of phases, wherein different media playlists are generated for each of the plurality of phases based on the different seed values.

4. The method of claim 1, wherein selecting the plurality of media items comprises:
   extracting seed features from a received seed value;
   identifying media items having one or more of the extracted seed features;
   determining parameter features that characterize the received event parameters; and
   filtering the identified media items based on the parameter features.

5. The method of claim 4, wherein filtering the identified media items comprises removing, from the identified media items, media items that are not characterized by the parameter features.

6. The method of claim 1, wherein receiving event parameters comprises:
receiving seed preference rules prioritizing seed values received from different users responsive to the different users' social network distances from a host of the social event; and
wherein the selecting selects media items responsive to the seed preference rules.

7. The method of claim 1, further comprising:
receiving feedback about a playlist media item presented at the social event from the plurality of client devices of the plurality of users at the social event; and
adjusting the media playlist based on the feedback.

8. The method of claim 1, wherein receiving event parameters comprises:
receiving, by the computer, a media feature rule specifying a required media feature, wherein the selecting must select media items with the required media features;
receiving, by the computer, a media feature rule specifying a restricted media feature, wherein the selecting must select media items without the restricted media feature; and
receiving, by the computer, a media feature rule specifying a preferred media feature, wherein the selecting selects more media items having the preferred media feature than items lacking the preferred media features.

9. The method of claim 1, further comprising:
receiving feedback about a playlist media item presented at the social event from the plurality of client devices of the plurality of users at the social event;
determining whether an amount of negative feedback in the received feedback exceeds a threshold; and
skipping a media item in the media playlist responsive to the amount of negative feedback exceeding the threshold.

10. A non-transitory computer-readable storage medium storing executable computer program instructions for generating a media playlist for a social event, the instructions executable to perform steps comprising:
receiving, by a computer, event parameters describing conditions for selecting media items to generate the media playlist for the social event, the event parameters specifying that certain seed values are prioritized above other seeds values;
receiving, by the computer, a plurality of seed values describing features of media to present during the social event, the plurality of seed values received from a plurality of client devices used by users at the social event, the client devices receiving a wireless broadcast indicating information about the media stream and enabling the plurality of users to provide seed values for the media stream;
receiving, by the computer, seed preference rules provided by different ones of the plurality of users at the social event, the seed preference rules specifying relative priorities of the plurality of seed values;
selecting, by the computer, a plurality of media items responsive to the event parameters and the plurality of seed values, wherein the selecting selects more media items with media features from higher priority seed values and fewer media items with media features from lower priority seed values based on the seed preference rules;
generating, by the computer, a media playlist for the social event, the media playlist including playlist media items from the selected plurality of media items;
retrieving, by the computer and from a media database, ones of the playlist media items; and
providing, by the computer, the retrieved playlist media items to a media player that presents the playlist media items at the social event as a media stream.

11. The computer-readable medium of claim 10, wherein receiving event parameters comprises:
receiving event parameters specifying a plurality of required media features, wherein the selecting selects media items with the required media features.

12. The computer-readable medium of claim 10, wherein receiving event parameters comprises:
receiving event parameters specifying a plurality of phases of the social event and specifying different seed values for each of the plurality of phases, wherein different media playlists are generated for each of the plurality of phases based on the different seed values.

13. The computer-readable medium of claim 10, wherein selecting the plurality of media items comprises:
extracting seed features from a received seed value;
identifying media items having one or more of the extracted seed features;
determining parameter features that characterize the received event parameters; and
filtering the identified media items based on the parameter features.

14. The computer-readable medium of claim 13, wherein filtering the identified media items comprises removing, from the identified media items, media items that are not characterized by the parameter features.

15. A device for generating a media playlist for a social event, comprising:
a processor configured to execute modules; and
a memory storing the modules, the modules executable to perform steps comprising:
receiving, by the processor, event parameters describing conditions for selecting media items to generate the media playlist for the social event, the event parameters specifying that certain seed values are prioritized above other seeds values;
receiving, by the processor, a plurality of seed values describing features of media to present during the social event, the plurality of seed values received from a plurality of client devices used by users at the social event, the client devices receiving a wireless broadcast indicating information about the media stream and enabling the plurality of users to provide seed values for the media stream;
receiving, by the processor, seed preference rules provided by different ones of the plurality of users at the social event, the seed preference rules specifying relative priorities of the plurality of seed values;
selecting, by the processor, a plurality of media items responsive to the event parameters and the plurality of seed values, wherein the selecting selects more media items with media features from higher priority seed values and fewer media items with media features from lower priority seed values based on the seed preference rules;
generating, by the processor, a media playlist for the social event, the media playlist including playlist media items from the selected plurality of media items;
retrieving, by the processor and from a media database, ones of the playlist media items; and providing, by the processor, the retrieved playlist media items to a media player that presents the playlist media items at the social event as a media stream.

16. The device of claim 15, wherein receiving event parameters comprises:

receiving event parameters specifying a plurality of required media features, wherein the selecting selects media items with the required media features.

17. The device of claim 15, wherein receiving event parameters comprises:

receiving event parameters specifying a plurality of phases of the social event and specifying different seed values for each of the plurality of phases, wherein different media playlists are generated for each of the plurality of phases based on the different seed values.

18. The device of claim 15, wherein selecting the plurality of media items comprises:

extracting seed features from a received seed value;

identifying media items having one or more of the extracted seed features;

determining parameter features that characterize the received event parameters; and filtering the identified media items based on the parameter features.

* * * * *